April 21, 1959 — A. F. CONTO — 2,882,827
CONTROL SYSTEM FOR A PUMP
Filed Dec. 15, 1952
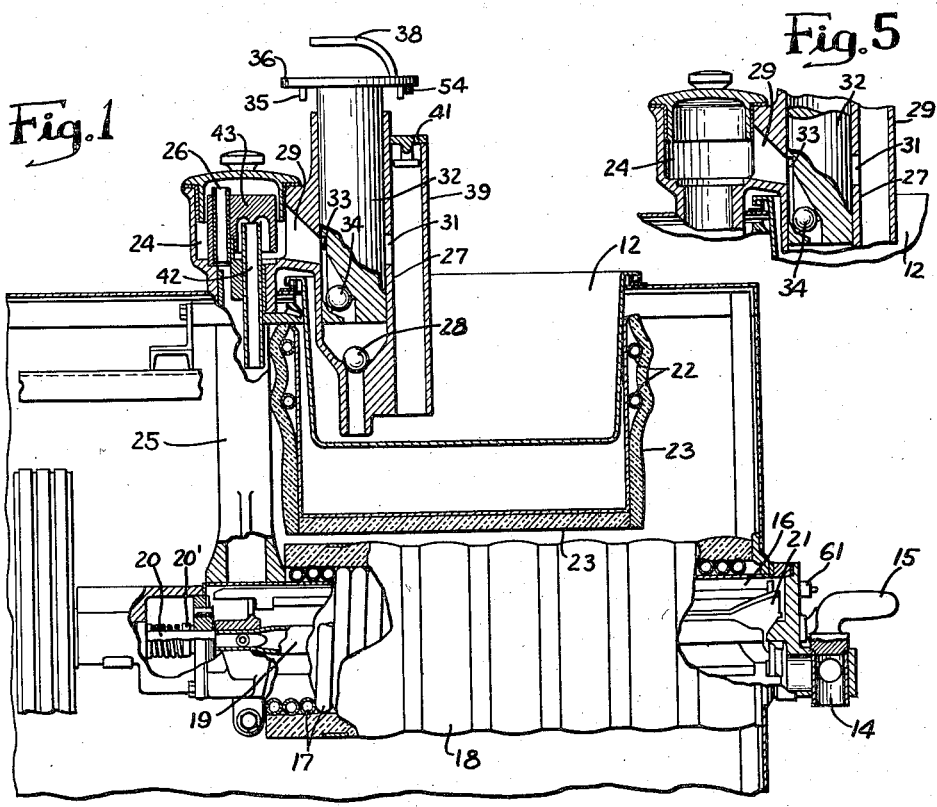
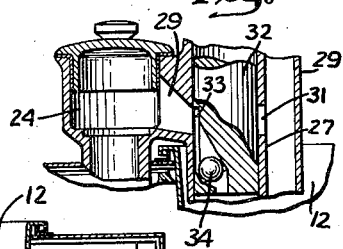
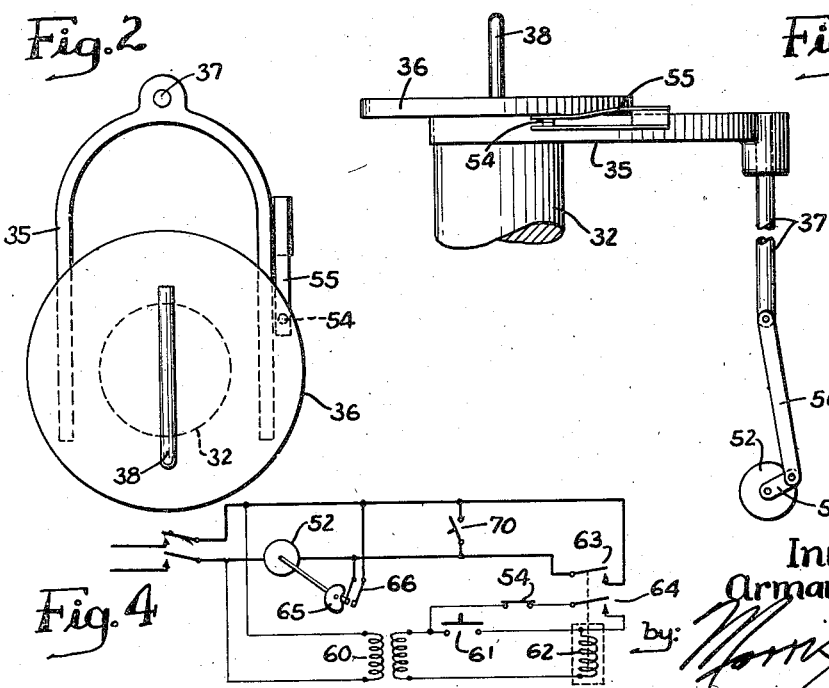
Inventor
Armando F. Conto
by Morris Spector
Atty.

United States Patent Office 2,882,827
Patented Apr. 21, 1959

2,882,827

CONTROL SYSTEM FOR A PUMP

Armando F. Conto, Chicago, Ill., assignor to Freez-King Corporation, Chicago, Ill., a corporation of Illinois Application December 15, 1952, Serial No. 326,024

16 Claims. (Cl. 103—25)

This invention relates to a control system for a pump, more particularly a reciprocating pump of the type used for pumping liquid in a processing machine wherein the product of the machine is repeatedly withdrawn in variable quantities, which may include relatively small quantities, and wherein the pump must supply raw material to the machine in amounts directly proportionate to the amounts withdrawn from time to time.

Consider, by way of example, a machine for congealing custard, wherein the mix flows through a refrigerating appaartus where it is congealed. In such apparatus it is necessary to maintain the quantity of the product in the freezer substantially constant. In frozen custard machines and the like the freezing container must not be completely filled as this would prevent the heater from whipping air into the product as it is being frozen. It is nevertheless desirable that the maximum permissible quantity of product be maintained in the freezing chamber to provide the maximum quantity of frozen product ready for dispensing. In such machines, both the mix and the frozen product are in a liquid state and are referred to as liquids, the product being designated "frozen custard" for convenience of description regardless of its exact make up or character and even though the custard is not a solid. As a quantity of frozen product is withdrawn it is desirable to supply to the freezing chamber a corresponding quantity of mix to be frozen. In order to maintain a proper flow of the material it is desirable that the pressure under which it acts shall be constant, and it has been found that the best pressure is atmospheric pressure.

In the prior art it has heretofore been proposed to provide a reciprocating pump for supplying mix to the freezing chamber, the pump being arranged to become ineffective when the back pressure of the pumping chamber reaches a predetermined value, the disabling being repeated during each stroke of the pump. As a result, in the systems of the prior art with which I am familiar and in which the pump is disabled by an excessive back pressure, reciprocation of the pump piston continues even after the pump is disabled and the net effect of the reciprocation at that time is that the pump merely circulates the mix without being effective to deliver any of it to the freezing chamber. It is one of the objects of the present invention to provide a pump control for a system such as above mentioned wherein when the pump is disabled by an excessive back pressure its operation continues only so long as is necessary to bring the pump piston to one predetermined position, namely, its retracted position, and then the pump is stopped.

It is a further object of the present invention to provide a pump control system wherein the stopping of the pump is always in such a position that atmospheric pressure is maintained in the supply chamber that supplies the mix to the freezing chamber.

It is a still further object of the present invention to provide such a system wherein the pump may be started either manually or automatically, and once started will continue until the desired quantity of liquid has been furnished to the supply compartment, as evidenced by the building up of the pressure in the supply compartment to a desired value, and then the pump will automatically stop in its retracted position to restore the pressure in the supply compartment to atmospheric pressure.

Reference may now be had more particularly to the accompanying drawings wherein is shown the present invention as applied to a known type custard freezing machine, it being understood that the invention is not limited in its application to custard freezing machines.

In the drawings:

Figure 1 is a partial vertical sectional view of a custard freezing machine to which the present invention has been applied;

Figure 2 is an enlarged top plan view of the pump piston and supporting means therefor;

Figure 3 is a diagrammatic fragmentary side view of the piston and the means for actuating the same;

Figure 4 is a circuit diagram of the pump motor controller circuit; and

Figure 5 is a fragmentary sectional view showing a modified construction of a portion of the structure of Figure 1.

Reference may now be had more particularly to the drawings wherein like reference numerals designate like parts throughout.

The frozen custard machine shown in Figure 1 is housed in a suitable cabinet and includes a storage chamber 12 closed by a suitable cover, not shown, into which storage chamber the liquid mix is to be placed, and includes a hollow plug type nozzle 14, manually controlled by a handle 15, through which nozzle the frozen custard flows.

As best seen in Figure 1, the mechanism includes a freezing container 16 mounted on a horizontal axis and cooled by refrigerating coils 17 wrapped around it. The container and coils may be insulated by a covering 18 and may contain mechanism for beating air into the mix including a rotatable beater including a shaft 19 extending axially through the container and carrying a series of scrapers or paddles 21. The beater is driven through a shaft 20 sealed by a seal 20' by means of an electric motor or other suitable power mechanism not shown.

In the operation of this machine, liquid mix is fed into the container 16 and is whipped by the beaters or paddles 21 while being cooled by the refrigerating coils. The completed product which is a relatively stiff although still fluent material is withdrawn by opening the valve 14 as desired. The withdrawals may be relatively small quantities as, for example, in serving ice cream cones or filling small containers, or may be in relatively large quantities and may be substantially continuous during busy periods. It is desired to maintain a substantially constant quantity of material in the freezing container at all times and not to withdraw it for storage before serving since its quality and flavor are altered by storage. It is therefore essential for the proper operation of machines of this type that replacement mix be supplied to the freezing container at substantially the maximum rate at which it can be frozen, ready for serving, yet not to over-fill the freezing container since a certain minimum air space is necessary.

Liquid mix to be supplied to the freezing container is held in a storage chamber 12 which is preferably cooled by refrigerating pipes 22 and is insulated by surrounding insulation 23. The mix in the storage chamber 12, which is in liquid condition, is pumped therefrom into a chamber 24 from which it ultimately flows from a syphon tube 42 to and through a vertical conduit 25 that leads to the inlet side of the freezing container 16. A small pipe 26 connects the upper part of the supply chamber 24 with the freezing container to equalize the pressure therein at all times, even during a feeding operation.

The liquid mix is pumped from the storage chamber into the supply chamber, in the embodiment shown, by a reciprocating piston pump which develops a maximum pressure per square inch equal to the weight of the piston divided by its area. The pump, as shown, is a vertical cylinder 27 having an inlet opening at its bottom communicating through a check valve 28 with the storage chamber. The cylinder is formed with a port 29 at one side communicating with the supply chamber 24 and at its other side is formed with a vent port 31 whose lower edge is approximately at the level of the bottom of the supply chamber 24. A piston 32 is slidable vertically in the cylinder between an upper or extended position and a lower or retracted position. The piston is formed with a passage connecting its bottom surface with a side port 33 therein which registers with the port 29 during the suction and discharge portions of the piston stroke. An upwardly opening check valve 34 is provided in this passage to prevent downward flow of material through the piston.

The piston is operated by a constant speed electric motor at any desired rate, say, one complete reciprocation each fifteen seconds. For each cycle of operation the piston is raised by a yoke member 35 engaging the lower side of a plate 36 that is secured to the piston. The yoke member is mounted on a vertically guided rod 37 (Fig. 3), which may be operated by a crank, cam, or the like, driven by suitable electric motor or other means. When the yoke is lowered the piston follows, under its own weight, acting as a displacement pump to force the mix from the cylinder space up through the piston valve and port into the supply chamber. For ease in cleaning the piston is designed so that it may be lifted out of the cylinder by a handle 38. When the valve 14 is closed the interior of the freezing container and the connected pipe 25 and the supply chamber 24 are closed off from the atmosphere except through the vent port 31. This normally maintains the system at atmospheric pressure. However, when the piston descends and covers the vent port 31 that space is no longer open to atmosphere and therefore the pressure therein which was atmospheric pressure at the instant that the piston closed the vent 31 now commences to rise as the piston forces the mix past the valve 34 and into the supply chamber 24.

In operation of the device as so far described the freezer container 16 will contain only air at the start of service and will contain a quantity of frozen product and some measure of air at all other times. When the piston 32 is elevated, the vent 31 is uncovered to vent the supply chamber and freezing chamber to atmosphere through a vent tube 39 having a vented cover 41 therein. At this time, any mix in the supply chamber will flow therefrom across the cylinder and out the vent port 31 to return to the storage chamber through the tube 39. During upward travel of the piston liquid mix from the storage chamber will be drawn into the cylinder so that it will be filled to the lower edge of the vent port 31, when the piston is in its uppermost position. As the piston starts to lower it will close the vent port 31 and will force liquid past the check valve 34 and through the ports 33 and 29 into the supply chamber 24.

To transfer liquid mix from the supply chamber to the freezing container, a vertically extending transfer pipe 42 extends upward through the bottom of the supply chamber, as shown. Preferably, mix is added to the freezing container in small batches with a minimum amount of re-circulation. Excessive re-circulation tends to churn the mix which is not desirable. For this purpose an inverted cup-shaped cap 43 is mounted over and in spaced relation to the pipe 42 to form therewith a syphon. With this construction, until the mix rises to the top of the cavity in cap 43, there will be no flow through the syphon. However, once the mix rises to this level, it will syphon over into the freezing container until it has dropped to the level of the bottom edge of the cap 43, leaving a relatively small quantity of mix to be drained back to the storage container. Thus, no mix will be added until the quantity displaced into the supply chamber by the piston reaches a predetermined minimum height at which time the small quantity in the supply chamber will be syphoned over into the freezing container. This action continues until there is a proper quantity of mix in the freezing container. At this time, therefore, there is a fixed and previously calculated quantity of air above the mix and extending into the supply chamber 24. When the pump piston moves toward its lowered position on the next stroke it again compresses the air in the supply chamber 24 by an amount equal to the pump displacement. The resulting rise in pressure, due to the precalculated volume of air in the supply chamber in relation to the stroke and weight of the piston, now reaches a value such that the back pressure on the bottom of the piston is sufficient to support the weight of the piston, before the piston has reached the bottom of its stroke. The descent of the piston therefore stops, the piston remaining stationary as the yoke 35 continues to descend. Once the yoke separates from the piston an electric circuit is prepared which will stop the motor and stop the movement of the yoke after the yoke completes its cycle and reaches its fully elevated position. An explanation will now be given of how this is accomplished.

The vertical drive rod 37 is reciprocated by a connecting rod 50 which is turned by a crank 51 operated by an electric motor 52. The yoke 35 carries a pair of piston controlled switch contacts 54 at the end of a pair of springs. The springs carrying the switch contacts are mounted on the yoke and they normally are open by the spring action of the upper leaf 55 that supports the upper switch contact 54. This leaf is located in such a position that when the yoke supports the piston the lower side of the plate 36 bears against the spring 55 and closes the contacts 54, as is illustrated in Figures 2 and 3. When the yoke recedes from the piston, that is, by the descent of the yoke while the piston is supported by back pressure at its under face, the spring 55 opens the contacts 54.

The motor 52 may be operated from a 220 volt line under control of a low voltage control circuit that is supplied with a low voltage from a step down transformer 60. A push button switch 61, when momentarily closed, completes a circuit for an eelctromagnetic relay switch 62. The switch 62 operates to close a set of motor control contacts 63 to complete a circuit for the electric motor 52, which thereupon commences to operate. At its contact 64 the electromagnetic switch 62 now establishes a holding circuit for itself through the contacts 54, so that the relay 62 remains operated even after the push button switch 61 is released. The motor 52 reciprocates the pump piston, as previously described. It also operates a cam 65 that closes a set of switch contacts 66 that establish another holding circuit for the motor. The cam 65 is in such a position that it permits opening of the switch contacts 66 only when the motor is in such a position that the yoke 35 has raised the piston to its uppermost position. Thus, during each cycle of rotation of the motor the contacts 66 open every time the yoke reaches its upper position. As long as the relay 62 remains operated, the opening of the contacts 66 is of no effect, and the motor 52 continues to rotate, and the pumping action continues until the piston 32, in its descent, encounters a pressure sufficient to support the piston, as previously described. Further descent of the yoke 35 causes it to separate from the plate 36, thus opening the switch contacts 54, thereby opening the holding circuit for the winding of the electromagnetic switch 62. This switch now opens, and at its contacts 64 further opens its holding circuit, so that upon subsequent reclosure of the contacts 54 the electromagnetic switch is not reoperated. At the contacts 63, now open, the relay has opened one of the circuits for the motor. The motor circuit remains complete through the contacts 66. The motor thus continues to operate until it raises the yoke 35 and the piston to their upper positions, at which time the contacts 66 open and, the contact 63 being already open, the motor circuit is broken and the motor stops. Thus, the motor always stops with the piston in its elevated position where the piston uncovers the vent port 31 (Fig. 1).

A manual start switch 61 is mounted at the front of the machine where it is readily accessible. It may, if desired, be mounted in the path of turning of the handle 15 so that every time the handle 15 is turned to open the valve 14 the handle will close the switch 61, although the switch 61 may also be closed manually without turning of the handle 15. If desired, the switch 61 may be located in a position where it is not actuated by the handle 15 so that the switch 61 is operated independently of the handle 15.

An auxiliary manual switch 70 is provided for operating the motor 52 whenever desired independently of the operation of the starting switch 61. When the switch 70 is closed the motor circuit is completed through that switch and the motor operates. Upon opening of the switch 70 the motor 52 then merely completes its cycle, its circuit being completed through the cam operated switch contacts 66, so that the motor will again stop under control of the cam contacts 66 with the yoke 35 in its raised position.

I have herein shown the present invention applied to a particular custard freezing machine. It is apparent from the above description that when there is a sufficient quantity of mix in the freezing container 16 the volume of air above the mix, up to and including the port 29, is such that when that volume is compressed an amount almost equal to the displacement of the pump piston per stroke (or slightly less than one stroke) the resulting rise in pressure of that air is sufficient to balance the piston and prevent complete descent thereof. The yoke 35 descends slightly further and causes separation of the contacts 54, so that on completion of the following up stroke of the yoke, the pump operating motor 52 stops. It is therefore apparent that by using the control system of the present invention on a machine as above described it is possible to omit the syphoning arrangement so that the mix discharged by the pump on each stroke flows through the discharge port 29 directly into the vertical conduit 25 leading to the container 16. This is illustrated in Figure 5, which shows the supply chamber 24 of the structure of Figure 1 with the syphoning arrangement omitted. In this arrangement the operation of the pump piston 32 is the same as previously described, and the control circuit is the same as previously described. In this construction, as the pump piston descends and forces mix past the check valve 34, that liquid flows through the discharge port 29 into the supply chamber 24 from which it immediately flows directly down the pipe 25 into the freezing container 16. The adjustment of this system is slightly different from that of Figure 1 in that in the system of Figure 5 substantially all of the liquid pumped by the piston 32 flows into the freezing container 16, whereas in the system of Figure 1 the liquid that is displaced in the fractional part of the last stroke of the piston does not flow into the freezing chamber but is returned to the supply chamber during the following upward movement of the pump piston.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. Apparatus for treating compounds including a processing chamber having an inlet and an outlet, means for maintaining a predetermined quantity of compounds in said chamber comprising a reciprocating piston pump for pumping said compounds to said chamber, electrically controlled pump operating means, means controlled by the piston for closing the chamber from the atmosphere at the commencement of each piston discharge stroke and reopening it to the atmosphere after the completion of each piston discharge stroke and before the commencement of the next discharge stroke whereby each piston stroke causes a rise of pressure from a base of atmospheric pressure, an electric limit switch for controlling the pump operating means to stop the pump, means for operating the switch to its pump stopping condition each time the pump piston reaches one predetermined position in its cycle of operation, a second switch responsive to the pressure developed by the piston when the chamber has a predetermined quantity of said compounds for operating said second switch, and circuit connections by-passing said limit switch and rendering it ineffective for controlling the pump operating means so long as the by-passing circuit connections are effective, and means including said second switch for rendering said by-passing circuit connections ineffective whereby upon actuation of the second switch the pump will be stopped by the limit switch when the pump piston next reaches said predetermined position.

2. Apparatus for treating compounds including a processing chamber having an inlet and an outlet and adapted to be partially filled with compounds to be treated and with a gaseous atmosphere overlying the compounds, means for maintaining a predetermined quantity of compounds in said chamber comprising a reciprocating piston pump for pumping said compounds to said chamber, electrically controlled pump operating means, means controlled by the piston for assuring a fixed gaseous pressure in the chamber at the commencement of each effective piston stroke and a rise of pressure from a base of said fixed pressure as the piston stroke proceeds, an electric limit switch for controlling the pump operating means to stop the pump, means for operating the switch to its pump stopping condition each time the pump piston reaches one predetermined position in its cycle of operation, a second switch, said apparatus including means responsive to the pressure developed by the piston when the chamber has said predetermined quantity of compounds for operating said second switch, and circuit connections by-passing said limit switch and rendering it ineffective for controlling the pump operating means so long as the by-passing circuit connections are effective, and means including said second switch for rendering said by-passing circuit connections ineffective whereby upon actuation of the second switch the pump will be stopped by the limit switch when the pump piston next reaches said predetermined position.

3. Apparatus for treating compounds including a processing chamber having an inlet and an outlet and adapted to be partially filled with compounds to be treated and with air overlying the compounds, said chamber being open to atmospheric pressure, means for maintaining a predetermined quantity of compounds in said chamber comprising a reciprocating piston pump for feeding said compounds to said chamber, electrically controlled pump operating means, means controlled by the piston for closing the chamber from the atmosphere at the commencement of each effective piston stroke and reopening it to the atmosphere after the completion of each effective piston stroke and before the commencement of the next corresponding effective piston stroke whereby each piston stroke causes a rise of pressure from a base of atmospheric pressure, an electric limit switch for controlling the pump operating means to stop the pump, means for operating the switch to its pump stopping condition each time the pump piston reaches one predetermined position in its cycle of operation, a second switch, said apparatus including means responsive to the pressure developed by the piston when the chamber has said predetermined quantity of compounds for operating said second switch, and circuit connections by-passing said limit switch and rendering it ineffective for controlling the pump operating means so long as the by-passing circuit connections are effective, and means including said second switch for rendering said by-passing circuit connections ineffective whereby upon actuation of the second switch the pump will be stopped by the limit switch when the pump piston next reaches said predetermined position.

4. Apparatus for treating compounds including a processing chamber adapted to be partially filled with compounds to be treated and with air overlying the compounds, said chamber being open to atmospheric pressure, means for maintaining a predetermined quantity of compounds in said chamber comprising a reciprocating piston pump for pumping said compounds to said chamber and having an inserted position and a retracted position and biased to one of said positions, means controlled by the piston for closing the chamber from the atmosphere at the commencement of each effective piston stroke and reopening it to the atmosphere after the completion of each effective piston stroke and before the commencement of the next corresponding effective piston stroke whereby each piston stroke causes a rise of pressure from a base of atmospheric pressure, a reciprocating member movable in one direction to move the piston against its bias and movable in the reverse direction to permit movement of the piston in the direction to which it is biased whereby there is a characteristic relative movement of the member with respect to the piston when the back pressure on the piston exceeds the force of the bias acting on the piston, electrically controlled operating means for the reciprocating member, an electric limit switch for controlling the operating means to stop the pump, means for operating the switch to its pump stopping condition each time the pump reaches one predetermined position in its cycle of operation, a second switch responsive to the relative movement of said reciprocating member with respect to the piston as a result of pressure developed by the piston, and circuit connections by-passing said limit switch and rendering it ineffective for controlling the pump operating means so long as the by-passing circuit connections are effective, and means including said second switch for rendering said by-passing circuit connections ineffective whereby upon actuation of the second switch the pump will be stopped by the limit switch when the pump piston next reaches its predetermined position.

5. Means for maintaining a predetermined quantity of liquid in an enclosed space that is open to the atmosphere which comprises, apparatus for delivering liquid into the space in fixed successive increments and for closing said space from the atmosphere during the delivery of each increment of liquid to the space during which the pressure in said space rises with the amount of liquid therein and opening said space to the atmosphere between deliveries of successive increments, starting means to start the operation of said apparatus, means for maintaining the operation of said apparatus independently of said starting means once the apparatus has started, and means for stopping said apparatus in response to a predetermined rise in pressure in said space occasioned by the presence of said predetermined quantity of liquid in said space during the delivery of a single increment of liquid to said enclosed space.

6. Means for maintaining a predetermined quantity of liquid in an enclosed space that is open to the atmosphere which comprises, apparatus for delivering liquid into the space in fixed successive increments and for closing said space from the atmosphere during the delivery of each increment of liquid to the space during which the pressure in said space rises with the amount of liquid therein and opening said space to the atmosphere between deliveries of successive increments, starting means responsive to the initiation of withdrawal of liquid from said space to start the operation of the said apparatus, means for maintaining the operation of said apparatus independently of said starting means once the apparatus has started, and means for stopping said apparatus in response to a predetermined rise in pressure in said space occasioned by the presence of said predetermined quantity of liquid in said space during the delivery of a single increment of liquid to said enclosed space.

7. Means for maintaining a predetermined quantity of liquid in an enclosed space that is open to the atmosphere which comprises, pumping apparatus for delivering liquid into the space in fixed successive increments, said apparatus in one range of positions thereof closing said space from the atmosphere during the delivery of each increment of liquid to the space during which the pressure in said space rises with the amount of liquid therein and in a given position outside of said range of positions opening said space to the atmosphere between deliveries of successive increments, starting means to start the operation of the said apparatus, means for maintaining the operation of said apparatus independently of said starting means once the apparatus has started, and means for stopping said apparatus in response to a predetermined rise in pressure in said space occasioned by the presence of said predetermined quantity of liquid in said space during the delivery of a single increment of liquid to said enclosed space, said stopping means including means for maintaining the apparatus in operation after said predetermined pressure has been reached only until said apparatus reaches said given position in its cycle of operation.

8. Apparatus for maintaining a predetermined quantity of compounds in a chamber, comprising a reciprocating piston pump, means controlled by the pump for maintaining the chamber at atmospheric pressure when the pump piston is in a predetermined position which it reaches at least once during each cycle of reciprocation of the pump piston and maintaining the chamber closed off from the atmosphere during at least a portion of each discharge stroke of the pump, which portion is the same fixed portion during each pumping cycle whereby during each cycle of operation of the piston there is a rise in pressure in the chamber to a value which is dependent upon the quantity of compounds in said chamber followed by a restoration of atmospheric pressure, means responsive to the initiation of the operation of the pump for maintaining it in operation until the pressure rise in said chamber above atmospheric pressure reaches a predetermined value occasioned by the presence of said predetermined quantity of compounds in said chamber during a fraction of a cycle of operation of the pump piston, and means thereafter effective for continuing the operation of the pump only until the pump piston reaches said predetermined position at which it again establishes atmospheric pressure in said chamber.

9. In combination with a reciprocating piston pump, off normal means effective when the pump piston is off of one normal position in its cycle of reciprocation for maintaining the operation of the pump until it reaches said normal position, means for maintaining the pump in operation independently of said off normal means, and means for disabling said second means when the back pressure developed by the piston reaches a predetermined value whereby the off normal means continues the operation of the pump only until the pump piston reaches its normal position in its cycle of operation.

10. Apparatus for maintaining a selected quantity of liquid in an enclosed space including in combination, a container for housing such liquid and air, an inlet port communicating with the interior of said container, a cylinder having an aperture therein communicating with said inlet port to expose the interior of said container to atmospheric pressure, a piston movable in said cylinder to a position which closes said aperture and arranged to thereafter force an additional amount of liquid into the then closed container wherein the pressure increases with the quantity of liquid therein until the pressure of air in said container reaches a predetermined pressure indicating the presence of the desired quantity of liquid in said container, means for reciprocating the piston, and means responsive to a rise in pressure in said space from atmospheric pressure to said predetermined pressure in a single stroke of the piston for initiating the stopping of the reciprocation of the piston.

11. Apparatus for maintaining a selected quantity of liquid in an enclosed space including in combination, a container for housing such liquid and air, an inlet port communicating with the interior of said container, a vertically disposed cylinder having an aperture therein communicating with said inlet port to expose the interior of said container to atmospheric pressure, a piston of a selected mass movable downwardly in said cylinder solely under the force of gravity to a position which closes said aperture and arranged to thereafter force an additional amount of liquid into the then closed container under a predetermined pressure wherein the pressure increases with the quantity of liquid therein until the pressure of air in said container reaches said predetermined pressure in a single stroke of the piston, means for reciprocating the piston, and means for initiating the stopping of the reciprocation of the piston when said predetermined pressure is reached.

12. Apparatus for maintaining a selected quantity of liquid in an enclosed space including in combination, a container for housing such liquid and air, means forming an inlet port communicating with the interior of said container, a piston, a cylinder containing said piston and having a first aperture communicating with said inlet port and having a second aperture exposed to atmospheric pressure and communicating with said inlet port when said piston is in one position, a storage chamber for said liquid, said piston being reciprocable in said cylinder and having a passage extending therethrough with a check valve therein, means for moving said piston to a first position to draw liquid from said chamber into said cylinder, said piston moving toward a second position to close said second aperture and force liquid through said passage and said first aperture into said container where the pressure of the air in said container increases with the quantity of liquid therein in a single stroke of the piston, and means responsive to a predetermined pressure in said container for initiating the stopping of the reciprocation of the piston.

13. Apparatus for maintaining a selected quantity of liquid in an enclosed space including in combination, a closed container for housing such liquid and air, an inlet port communicating with the interior of said container, a storage chamber for said liquid, a piston, a vertically disposed cylinder containing said piston and having a first side aperture communicating with said inlet port, having a second side aperture exposed to atmospheric pressure which second aperture communicates with said inlet port in one position of the piston, and having a bottom port with a check valve therein communicating with said storage chamber, a piston of a selected mass reciprocable in said cylinder and having a passage extending therethrough with a check valve therein, means for moving said piston to its upper position to draw liquid from said storage chamber through said bottom port and into said cylinder, and said piston moving toward its lower position solely by the force of gravity to close said second aperture and force liquid through said passage and first aperture into said container under a predetermined pressure where the pressure therein increases with the quantity of liquid therein, and such downward motion continuing until the pressure of air in said container reaches said predetermined pressure, and means responsive to the termination of the downward movement of said piston before reaching the end of its normal path of travel for initiating the stopping of the reciprocation of the piston.

14. Apparatus for maintaining a selected quantity of non-gaseous matter in an enclosed space including in combination, a closed container for housing such matter and a gas, an inlet communicating with the interior of said container, a supply mechanism which in each cycle of operation thereof initially opens said inlet to a selected pressure to establish the interior of said container at said selected pressure and then closes said inlet to said selected pressure for forcing additional matter into said container, the pressure in said container increasing with the quantity of liquid therein, means for cyclically operating said supply mechanism to supply such matter to said container, and means responsive to the attainment of a predetermined pressure indicating the presence of the desired quantity of matter in said container for stopping the operation of said supply mechanism.

15. Apparatus for treating compounds including a processing chamber having an inlet and an outlet, means for maintaining a predetermined quantity of compounds in said chamber comprising a reciprocating piston pump for pumping said compounds to said chamber, electrically controlled pump operating means, an electric limit switch for controlling the pump operating means to stop the pump, means for operating the switch to its pump stopping condition each time the pump piston reaches one predetermined position in the cycle of operation, a second switch, the apparatus including means responsive to the pressure developed by the piston when the chamber has a predetermined desired quantity of said compounds for operating said second switch, and circuit connections by-passing said limit switch and rendering it ineffective for controlling the pump operating means so long as the by-passing circuit connections are effective, and means including said second switch for rendering said by-passing circuit connections ineffective whereby upon actuation of the second switch the pump will be stopped by the limit switch when the pump piston next reaches said predetermined position.

16. Apparatus for maintaining a selected quantity of liquid in an enclosed space including in combination: a container for housing such liquid and air, an inlet port communicating with the interior of said container, a piston, a cylinder containing said piston and having a first aperture communicating with said inlet port and having a second aperture exposed to atmospheric pressure and communicating with said inlet port when the piston is in one position, a storage chamber for said liquid, said piston being arranged to draw liquid from said chamber, close said second aperture during a portion of the cycle of operation of the piston, and deliver liquid through said inlet port into said container while said second aperture is closed, whereby the pressure in said container increases with the quantity of liquid therein, means for reciprocating the piston, and means for initiating the stoppage of said piston when the pressure in said container indicates the presence of the desired quantity of liquid in said container.

References Cited in the file of this patent
UNITED STATES PATENTS

| | | |
|---|---|---|
| 750,115 | Orr | Jan. 19, 1904 |
| 1,201,660 | Weatherhead et al. | Oct. 17, 1916 |
| 1,489,143 | Nuss | Apr. 1, 1924 |
| 1,493,259 | Green | May 6, 1924 |
| 2,099,253 | Bagby | Nov. 16, 1937 |
| 2,351,828 | Marsh | June 20, 1944 |
| 2,481,320 | Madorsky | Sept. 6, 1949 |
| 2,550,942 | Spangler | May 1, 1951 |
| 2,777,393 | Woodruff | Jan. 15, 1957 |